(No Model.)
H. W. MATTHEWS.
CUTTING APPARATUS FOR CORN AND CANE HARVESTERS.
No. 351,878. Patented Nov. 2, 1886.
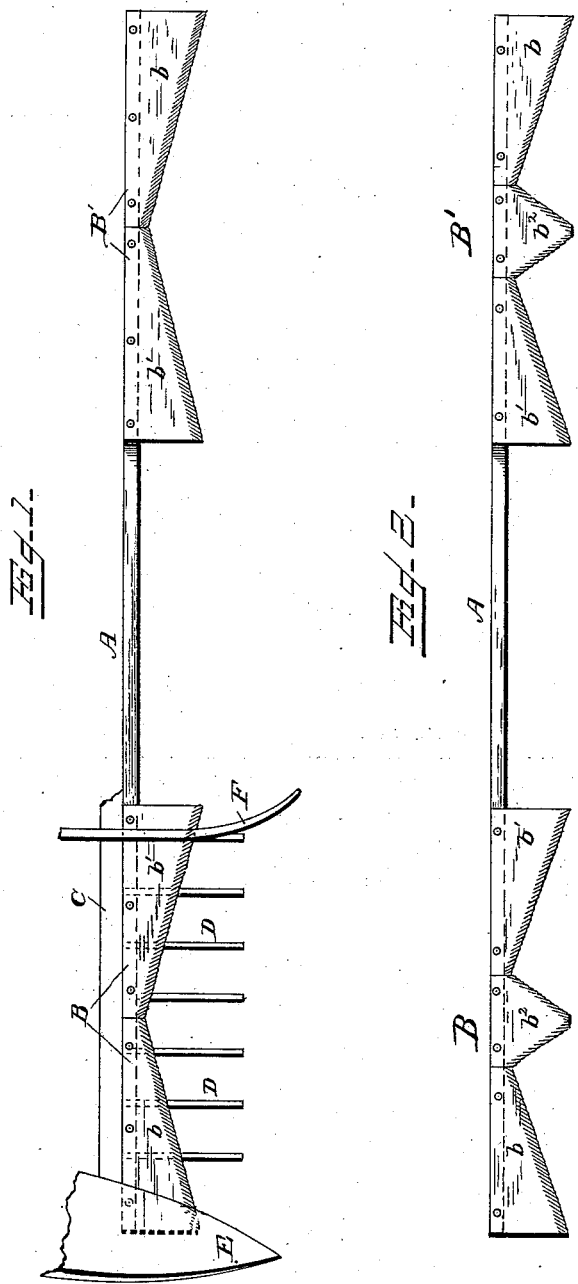
WITNESSES
INVENTOR
Hugh W. Matthews
by A. M. Smith
Attorney

UNITED STATES PATENT OFFICE.

HUGH W. MATTHEWS, OF BALTIMORE, MARYLAND.

CUTTING APPARATUS FOR CORN AND CANE HARVESTERS.

SPECIFICATION forming part of Letters Patent No. 351,878, dated November 2, 1886.

Application filed December 12, 1885. Serial No. 185,520. (No model.)

*To all whom it may concern:*

Be it known that I, HUGH W. MATTHEWS, of Baltimore, and State of Maryland, have invented a new and useful Improvement in Cutting Apparatus for Corn and Cane Harvesters, of which the following is a full, clear, and exact description, reference being had to the accompanying drawings, making part of this specification.

My invention relates to a novel construction of the cutting apparatus of a corn and cane harvester, and more particularly to the construction of the knife sections or blades, whereby they are adapted to act upon the hard and heavy stalks of the corn alternately from opposite sides with a long drawing cut, particularly adapted to the heavier work required of them, as compared with that performed by the cutters of reaping and mowing machines, and avoiding the heavy chopping action incident to the use of cutters of the ordinary construction in this class of harvesting-machines.

In the accompanying drawings, Figure 1 is a plan or top view of my improved knife or sickle, showing also its relation to the guards or fingers applied at one end thereof. Fig. 2 is also a plan view showing a modification in the construction of the knife.

The knife-bar (indicated at A) is preferably made similar to that described in reissued Letters Patent granted to me May 26, 1885, No. 10,601—that is to say, to extend across the entire front of the machine to which it is to be applied, and provided with knives at each end for adapting it to act on the two rows of corn between which the machine is drawn in operation; and B and B' indicate the serrated knives, which are rigidly secured to the bars A by means of screws, rivets, or other suitable means for the purpose. These knives are made, preferably, each in two parts or sections, $b$ and $b'$, each made tapering toward the other, and with their narrower ends brought in contact or into close proximity, and the two, when thus brought together, of a length adapting them to cross the cutting-space occupied by the guards or fingers at one side of the machine and between the deflecting guards or boards at the sides thereof, and sufficiently beyond the inner operative sides of the latter to permit the required lateral movement of the knife without uncovering its ends. Thus at the end B, C indicates a portion of the bar to which the fingers or guards D are applied, and E and F the deflecting boards or guards at the sides thereof, the knife sections $b$ and $b'$ extending across the space between the deflectors E and F and sufficiently beyond the adjacent sides thereof to allow for the endwise play or movement of the knife, as explained. The rear edges of the knife-sections are parallel with the bar C, and the taper of the sections is all on the forward edges, which are beveled and serrated in any usual manner for giving them the required sharpness or said edges. By giving to the knife thus constructed a long throw or endwise movement, which is preferred, any given point of the cutting-edge of the knife may be made to pass through two or more of the guards or fingers upholding the stalks against the side thrust of the knife, and a long drawing cut is produced by the sections $b$ as the knife moves inward and by the sections $b'$ as the knife moves outward, an action which has been found in practice to be peculiarly effective in cutting the hard and heavy stalks of corn, and one which avoids the heavy chopping action of the cutters heretofore employed in this class of machines as ordinarily constructed.

In Fig. 2 a modification in the construction of the knife is shown, consisting in the interposition of a short double beveled knife-section, $b^2$, between the adjacent ends of the long tapering sections $b$ and $b'$. This section is of form substantially like those in common use, except that it is preferred to serrate its beveled cutting-edges like those of sections $b$ and $b'$, and its office is to finish the work begun in the cutting movement of the portions of sections $b$ and $b'$ adjacent thereto by chopping off the partially cut stalks, and thus to prevent their being crowded upon and thrown down by the advancing machine, while the section $b$ or $b'$ is being moved through the inoperative portion of its throw.

Aside from the particular feature of improvement described, the machine may be similar to that described in my former patent, or of any usual or preferred construction, and it need not therefore be further described herein.

Having now described my invention, I claim as new—

1. In a corn-harvester, the combination, with the reciprocating knife-bar, of the pair of long cutter-sections $b$ and $b'$, made tapering from their outer ends inward toward the center of the cutting-space, substantially as described.

2. The combination, with the reciprocating knife-bar, of the long tapering knife-sections $b$ and $b'$, secured in pairs to the opposite ends of said bar and made tapering toward each other and the center of the cutting-spaces, substantially as described.

3. The knife-bar provided with the pair of long knife-sections $b$ and $b'$, extending at their outer ends beyond and in combination with the deflecting-boards at the sides of the cutting-space, and made tapering from said ends inward toward the center of the cutting-space, substantially as described.

4. The combination, with the knife-bar, of the long tapering knife-sections $b$ and $b'$, and the interposed short double beveled section $b^2$, arranged and operating substantially as described.

In testimony whereof I have hereunto set my hand this 9th day of December, A. D. 1885.

HUGH W. MATTHEWS.

Witnesses:
HENRIK SUNNE,
AUGUSTUS L. CLAYTON.